(No Model.)
C. L. WORK.
WHEEL FOR VEHICLES.
No. 246,650. Patented Sept. 6, 1881.
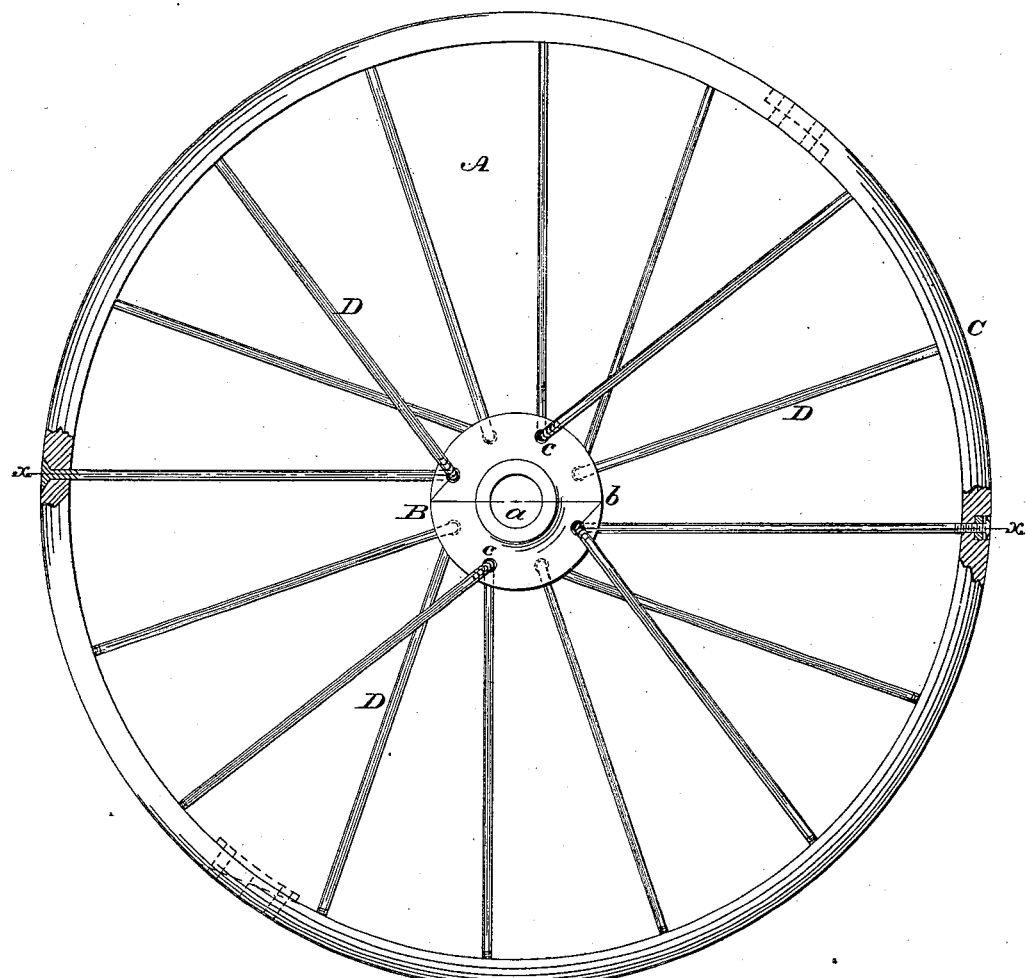
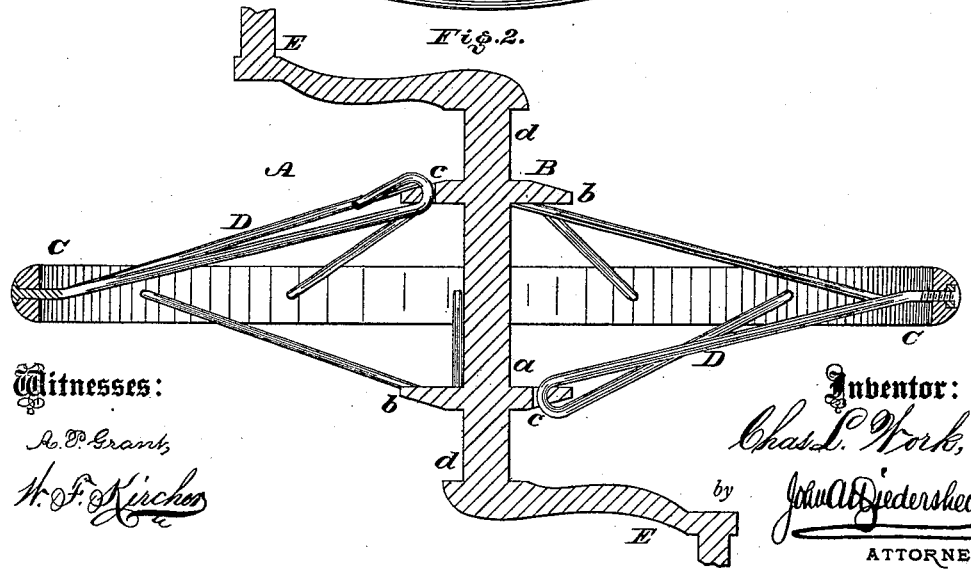

UNITED STATES PATENT OFFICE.

CHARLES L. WORK, OF PHILADELPHIA, PENNSYLVANIA.

WHEEL FOR VEHICLES.

SPECIFICATION forming part of Letters Patent No. 246,650, dated September 6, 1881.

Application filed April 8, 1881. (No model.)

*To all whom it may concern:*

Be it known that I, CHARLES L. WORK, a citizen of the United States, residing in the city and county of Philadelphia, and State of Pennsylvania, have invented a new and useful Improvement in Wheels for Vehicles, which improvement is fully set forth in the following specification and accompanying drawings, in which—

Figure 1 is a side elevation, partly broken away, of the wheel embodying my invention. Fig. 2 is a section thereof in line $x\ x$, Fig. 1.

Similar letters of reference indicate corresponding parts in the two figures.

This invention relates to vehicle and other wheels; and it consists of a wheel having two sets of V-shaped rods, each rod forming two spokes, which are respectively on the right and left of a line perpendicular to the axis of the wheel, and the spokes of the two sets alternating and having their outer ends in the same vertical plane.

It also consists of a wheel-hub with two cranks and two flanges, all cast in one piece, in combination with two sets of spokes secured to said flanges and to the tire, substantially as hereinafter set forth.

Referring to the drawings, A represents a wheel, consisting of the hub B, tire C, and spokes D, all formed of metal.

The hub is formed of a cast metallic tube or mandrel, $a$, having two flanges, $b\ b$, which latter are pierced near their circumference, as at $c$, and the spokes are constructed of wire bent in V shape, the bend or angle being passed through one of the openings $c$ and its ends secured to the tire C. It will be seen that each V-shaped spoke is so bent that its limbs pass to the right and left of a perpendicular, and the spokes are in two series which extend alternately from the opposite flanges $b$ to the tire, and are thus staggered. By this construction I produce in the wheel a series of trusses, each of which presents a double bracing for the wheel by the two limbs of each spoke, and consequently a fourfold bracing by the duplication of the spokes alternately on opposite sides of the hub, and the adjacent spokes serve as additional bracings, whereby the wheel is exceedingly strong, and will run true, and is simple and of few parts, inexpensive, and reliable.

The ends of the spokes may be headed or riveted to the tire, or threaded to engage with nuts let into countersinks in the tire. After the spokes are properly strained or tightened by the nuts, the ends of the spokes are riveted on the nuts, and thus the parts are firmly connected.

Cast with the hub B, at both sides thereof, are bearing-pieces $d$, continuous of which are cranks E, this feature of my invention being serviceable where cranks are required, as in the case of velocipedes. By this construction I combine the hub and cranks in one, obviate loose joints, reduce the number of parts, and lessen the expense of manufacture.

The ends of the tire are connected either by a piece or plate of metal riveted to said ends or by forming lap-joints on said ends and passing rivets through the same, whereby I dispense with welding and cause the curvature of the wheel to be uniform and true.

Having thus described my invention, what I claim as new, and desire to secure by Letters Patent, is—

1. The wheel having two sets of V-shaped rods, each rod forming two spokes, which are respectively on the right and left of a line perpendicular to the axis of the wheel, and the spokes of the two sets alternating and having their outer ends in the same vertical plane.

2. The hub with two cranks and two flanges, all cast in one piece, in combination with two sets of spokes secured to said flanges and to the tire, substantially as set forth.

CHAS. L. WORK.

Witnesses:
JOHN A. WIEDERSHEIM,
A. P. GRANT.